(12) United States Patent
Oroza

(10) Patent No.: US 9,546,644 B2
(45) Date of Patent: Jan. 17, 2017

(54) WIND TURBINE FOR INSTALLATION IN BUILDINGS

(71) Applicant: Carlos Gabriel Oroza, Coppell, TX (US)

(72) Inventor: Carlos Gabriel Oroza, Coppell, TX (US)

(*) Notice: Subject to any disclaimer, the term of this patent is extended or adjusted under 35 U.S.C. 154(b) by 105 days.

(21) Appl. No.: 14/050,217

(22) Filed: Oct. 9, 2013

(65) Prior Publication Data

US 2014/0097082 A1    Apr. 10, 2014

Related U.S. Application Data

(60) Provisional application No. 61/711,687, filed on Oct. 9, 2012.

(51) Int. Cl.

| | | |
|---|---|---|
| *F03D 3/00* | (2006.01) | |
| *F03D 9/00* | (2016.01) | |
| *C25B 9/04* | (2006.01) | |
| *F03D 3/04* | (2006.01) | |
| *C25B 15/00* | (2006.01) | |
| *C25B 1/04* | (2006.01) | |

(52) U.S. Cl.
CPC . *F03D 9/35* (2016.05); *C25B 1/04* (2013.01); *C25B 9/04* (2013.01); *C25B 15/00* (2013.01); *F03D 3/002* (2013.01); *F03D 3/0427* (2013.01); *F03D 9/002* (2013.01); *F03D 9/19* (2016.05); *Y02E 60/366* (2013.01); *Y02P 20/133* (2015.11)

(58) Field of Classification Search
USPC ...................................................... D13/115
See application file for complete search history.

(56) References Cited

U.S. PATENT DOCUMENTS

| | | | | |
|---|---|---|---|---|
| 4,084,918 A | * | 4/1978 | Pavlecka | F03D 1/04 290/55 |
| 4,329,593 A | * | 5/1982 | Willmouth | F03D 3/065 290/44 |
| 5,009,569 A | * | 4/1991 | Hector, Sr. | F03D 3/04 415/4.1 |
| D336,762 S | * | 6/1993 | Miller | D25/1 |
| 5,279,260 A | * | 1/1994 | Munday | 204/258 |

(Continued)

FOREIGN PATENT DOCUMENTS

| | | |
|---|---|---|
| KR | 1073897 B1 | 10/2011 |
| RU | 2158849 C2 | 11/2000 |

(Continued)

OTHER PUBLICATIONS

Harrison et al, "Renewable Hydrogen: Integration, Validation, and Demonstration", National Renewable Energy Laboratoy, Conference Paper NREL/CP-581-43114, Jul. 2008, 2008 NHA Annual Hydrogen Conference obtained at http://www.nrel.gov/docs/fy08osti/43114.pdf.*

(Continued)

*Primary Examiner* — Harry D Wilkins, III

(57) ABSTRACT

In general a building, preferably a skyscraper, is situated with a face toward the prevailing winds of the area. Within the building is a system for capturing the prevailing winds and converting the prevailing winds into energy for use by the building or for local energy needs. The system is capable of being retrofitted into existing buildings because the elements of the system are scalable.

22 Claims, 11 Drawing Sheets

(56) References Cited

U.S. PATENT DOCUMENTS

| | | | | |
|---|---|---|---|---|
| 5,394,016 A | * | 2/1995 | Hickey | 290/55 |
| 5,592,028 A | * | 1/1997 | Pritchard | F03D 9/02 |
| | | | | 290/1 R |
| 5,977,649 A | * | 11/1999 | Dahill | 290/55 |
| 6,041,596 A | * | 3/2000 | Royer | F03D 1/04 |
| | | | | 290/44 |
| 6,097,104 A | * | 8/2000 | Russell | F03D 9/008 |
| | | | | 290/1 R |
| 6,765,309 B2 | * | 7/2004 | Tallal, Jr. | F03D 11/04 |
| | | | | 290/44 |
| 7,635,924 B1 | * | 12/2009 | Chen | F03D 7/048 |
| | | | | 290/44 |
| 8,063,502 B1 | * | 11/2011 | Voyles | F03D 1/04 |
| | | | | 290/55 |
| 8,303,781 B2 | * | 11/2012 | Botte | C25B 1/02 |
| | | | | 204/242 |
| 2003/0205482 A1 | * | 11/2003 | Allen | C25B 9/06 |
| | | | | 205/630 |
| 2004/0113431 A1 | * | 6/2004 | Huang | 290/55 |
| 2005/0183962 A1 | * | 8/2005 | Oakes | 205/340 |
| 2007/0126240 A1 | * | 6/2007 | Richards | F03D 3/002 |
| | | | | 290/55 |
| 2008/0248350 A1 | * | 10/2008 | Little | C25B 1/04 |
| | | | | 429/443 |
| 2010/0171315 A1 | * | 7/2010 | Flood | F03B 17/062 |
| | | | | 290/55 |
| 2010/0213719 A1 | * | 8/2010 | Botan | F03D 1/04 |
| | | | | 290/55 |
| 2010/0258449 A1 | * | 10/2010 | Fielder | 205/628 |
| 2011/0049992 A1 | * | 3/2011 | Sant'Anselmo | F03D 1/005 |
| | | | | 307/64 |
| 2011/0133468 A1 | * | 6/2011 | Leith | F03D 3/002 |
| | | | | 290/55 |
| 2012/0068464 A1 | * | 3/2012 | Farb | F03D 3/061 |
| | | | | 290/52 |
| 2012/0187698 A1 | * | 7/2012 | Bassett | F03D 3/005 |
| | | | | 290/55 |
| 2013/0251506 A1 | * | 9/2013 | Chu | 415/4.3 |

FOREIGN PATENT DOCUMENTS

| | | |
|---|---|---|
| RU | 2298688 C1 | 5/2007 |
| RU | 2319038 C1 | 3/2008 |
| RU | 2438040 C2 | 12/2011 |
| WO | WO 03/052267 A1 * | 6/2003 |
| WO | 03/072938 A1 | 9/2003 |

OTHER PUBLICATIONS

Lucas, Michael, CFD Modelling of Center Cones, Vortex Breakers and Pressure Relief Slits in a Wind Speed Accelerator, May 2011, University of Louisville Department of Chemical Engineering.*

Russian International Searching Authority; International Search Report & Written Opinion for PCT/US2013/064170; Jan. 10, 2014; Moscow, RU.

* cited by examiner

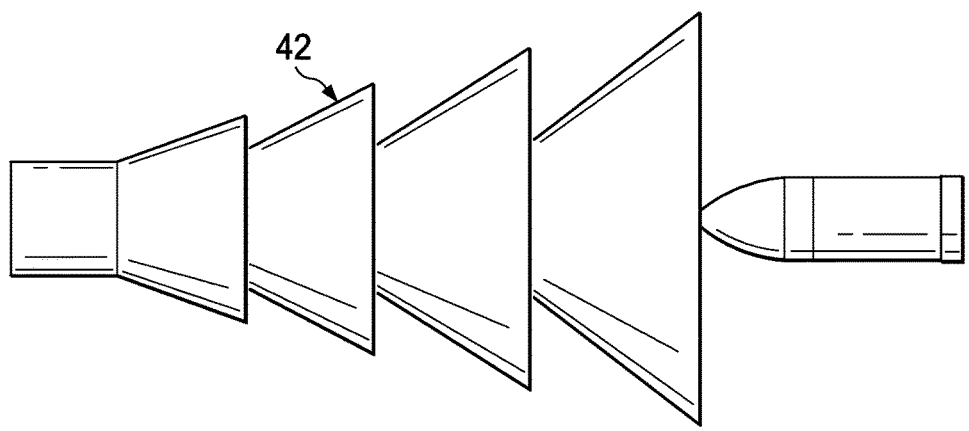
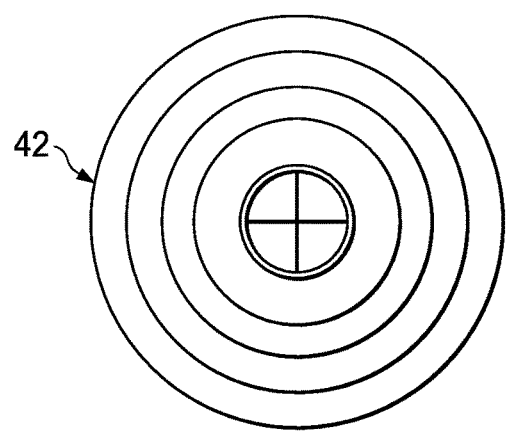
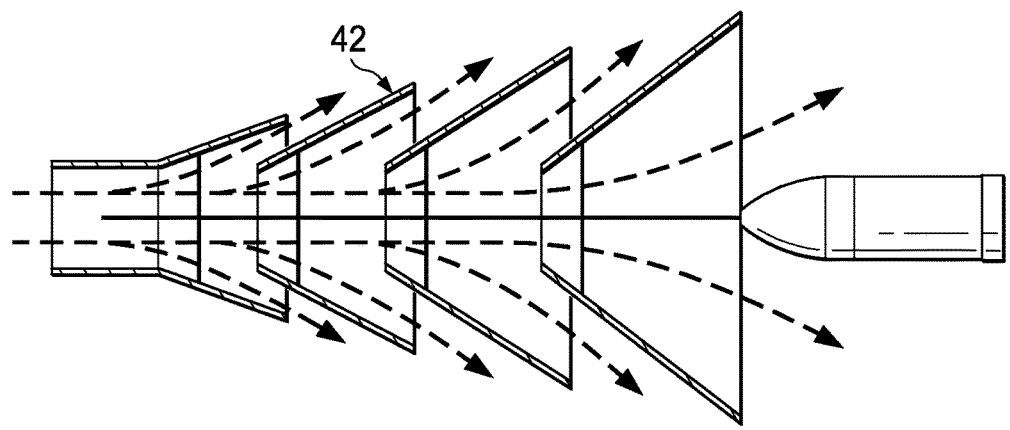
FIG. 11

WIND TURBINE FOR INSTALLATION IN BUILDINGS

CROSS-REFERENCE TO RELATED APPLICATIONS

This application claims priority to and the benefit of the filing date of U.S. provisional application Ser. No. 61/711,687 filed on Oct. 9, 2012, the disclosure of which is incorporated herein for all purposes.

FIELD OF THE INVENTION

This invention relates to devices that utilize energy from wind to create electrical power.

BRIEF SUMMARY OF THE INVENTION

In general a building, preferably a skyscraper, is situated with a face toward the prevailing winds of the area. Within the building is a system for capturing the prevailing winds and converting the prevailing winds into energy for use by the building or for local energy needs. The system is capable of being retrofitted into existing buildings because the elements of the system are scalable.

BRIEF DESCRIPTION OF THE DRAWINGS

For a more complete understanding of the present invention, and the advantages thereof, reference is now made to the following descriptions taken in conjunction with the accompanying drawings, in which

FIG. 11 is a composite view of wind speed reducing apparatus that may be used in an embodiment of the invention.

DETAILED DESCRIPTION OF THE INVENTION

Figure 1:
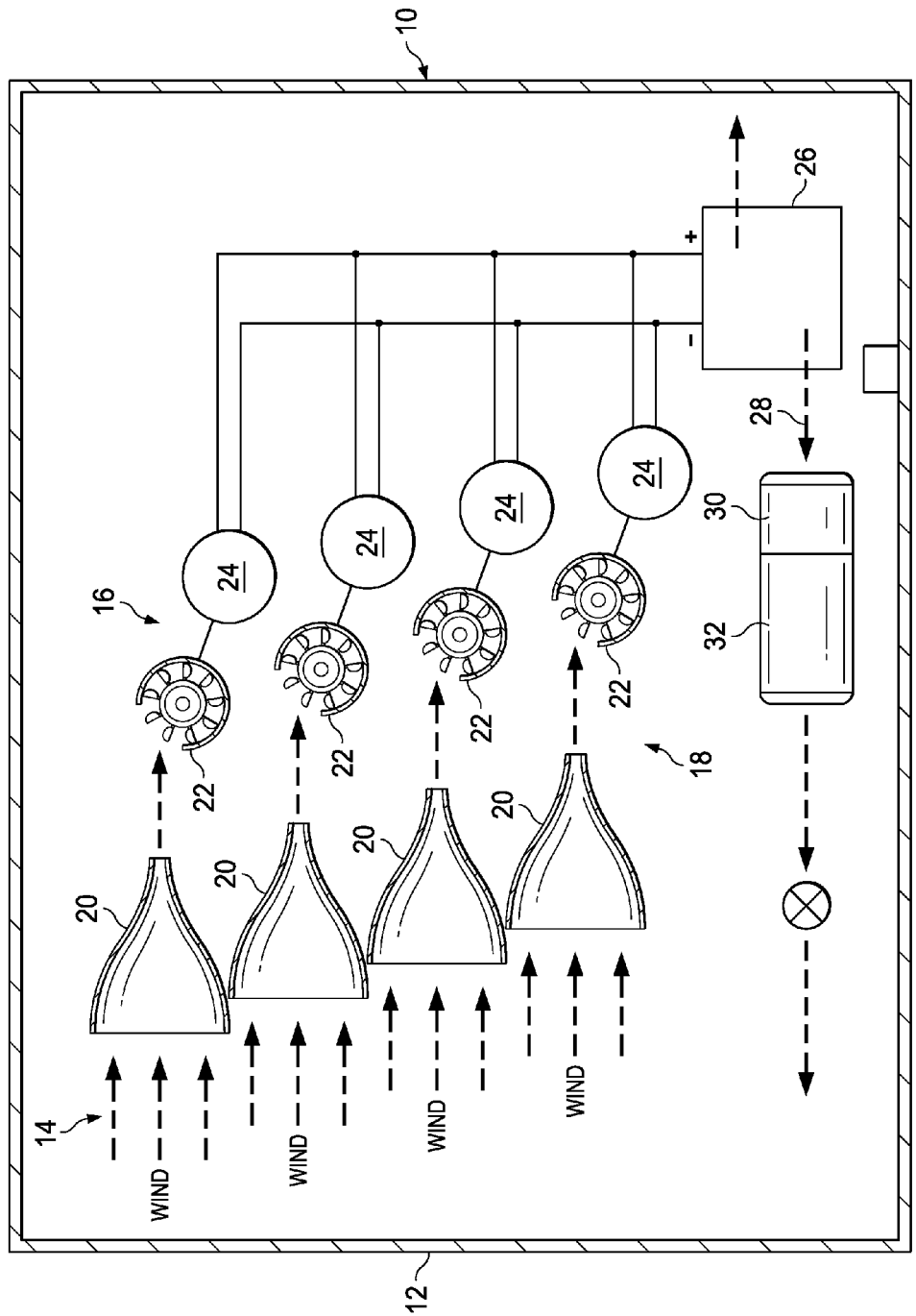
FIG. 1 is a schematic of the functional elements and process of an embodiment of the invention.

In general a high-rise building 10, preferably as skyscraper, is situated with as face 12 toward the prevailing winds 14 of the area. Within the building 10 is a system 16 for capturing the prevailing winds 14 and converting the prevailing winds 14 into energy for use by the building 10 or for local energy needs. The system 16 is capable of being retrofitted into existing buildings 10 because the elements 18 of the system 16 are scalable. Building 10 may be an office building, a residential building, or some mix of both and other uses. Building 10 is not a simple support structure fit the power system 16, but is instead powered by the system 16.

As shown in FIG. 1 the system 14 within the building 10 will generally comprise a wind-capturing funnel 20 to direct the prevailing winds 14 toward a wind turbine 22 that is connected to a direct current generator 24. The direct current is used for producing hydrogen through electrolysis. As shown in FIG. 1 the electricity from the generator 24 is used in an electrolysis unit 26 process to create hydrogen gas 28 that is easy to store in a compressed state and may be then used for heat or to generate electricity on demand.

FIG. 1 holier shows that multiple funnels 20 may be aligned with multiple corresponding turbines 22 and generators 24. Using multiple sets allows for several advantages, such as using smaller equipment that is easier to fit into a standard building 10 floor and that will be more reactive to relatively lower wind 14 velocities. The multiple generators 24 are shown connected to single electrolysis unit 26 so that even if the turbines are barely spinning their combined capacity may still generate hydrogen 28. It is possible that multiple electrolysis units 26 may be employed to better fit a particular building 10. The hydrogen 28 is then compressed by a compressor 30 and stored in a storage unit 32 that may be located on the same floor of the building 10 or may be in a more secure location as needed.

Figure 2:
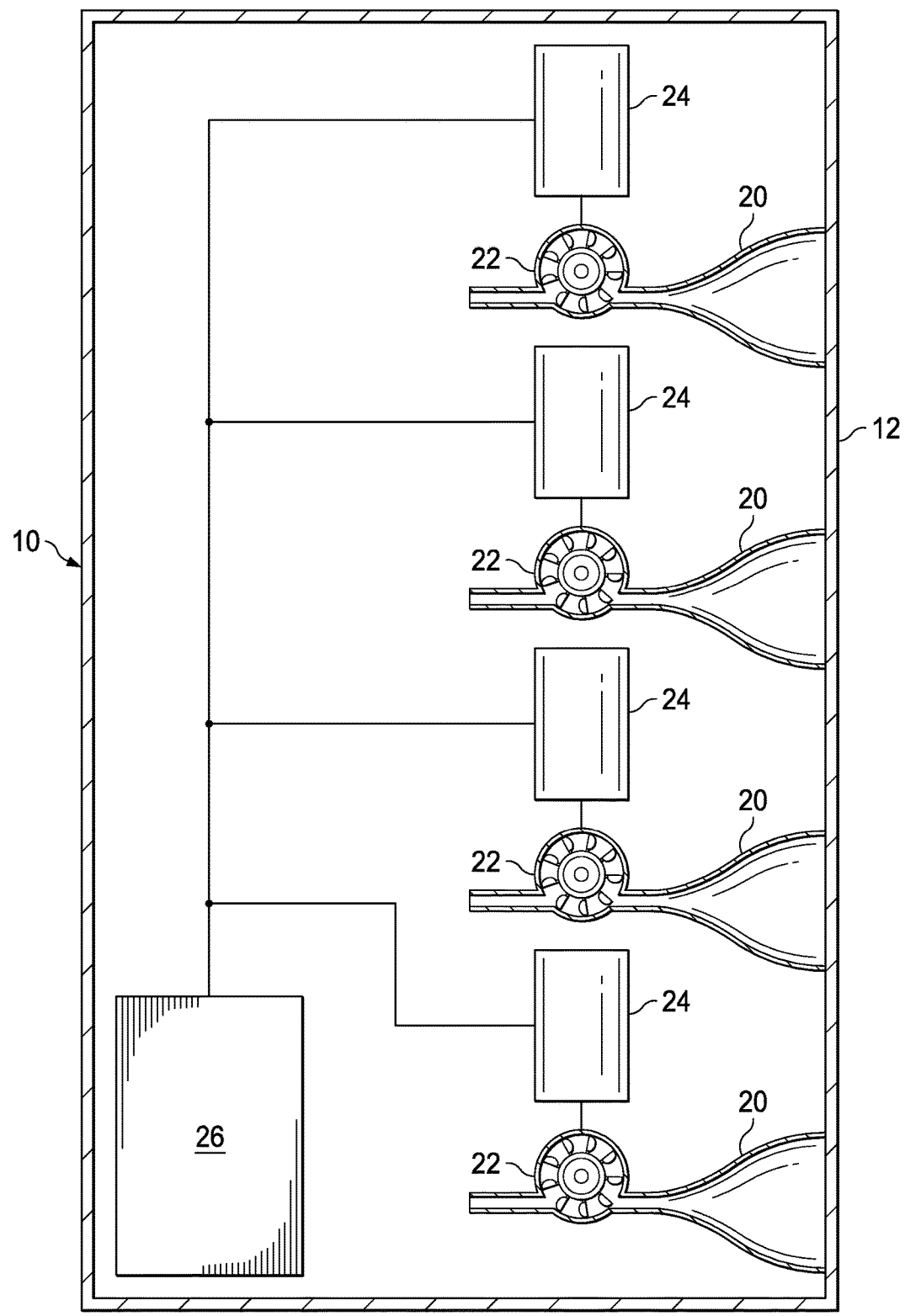
FIG. 2 is a plan view of an embodiment of the invention as installed in a building.

FIG. 2 is a plan view of an embodiment of the invention as installed in a building 10. In this embodiment four funnels 20 are attached to four turbines 22 and four generators 24. The four generators are connected to a single electrolysis unit 26. All of these elements 18 of the system 16 are located on a single floor of a building 10 with the funnels 20 positioned on the face 12 that faces the prevailing winds 14.

Figure 3:
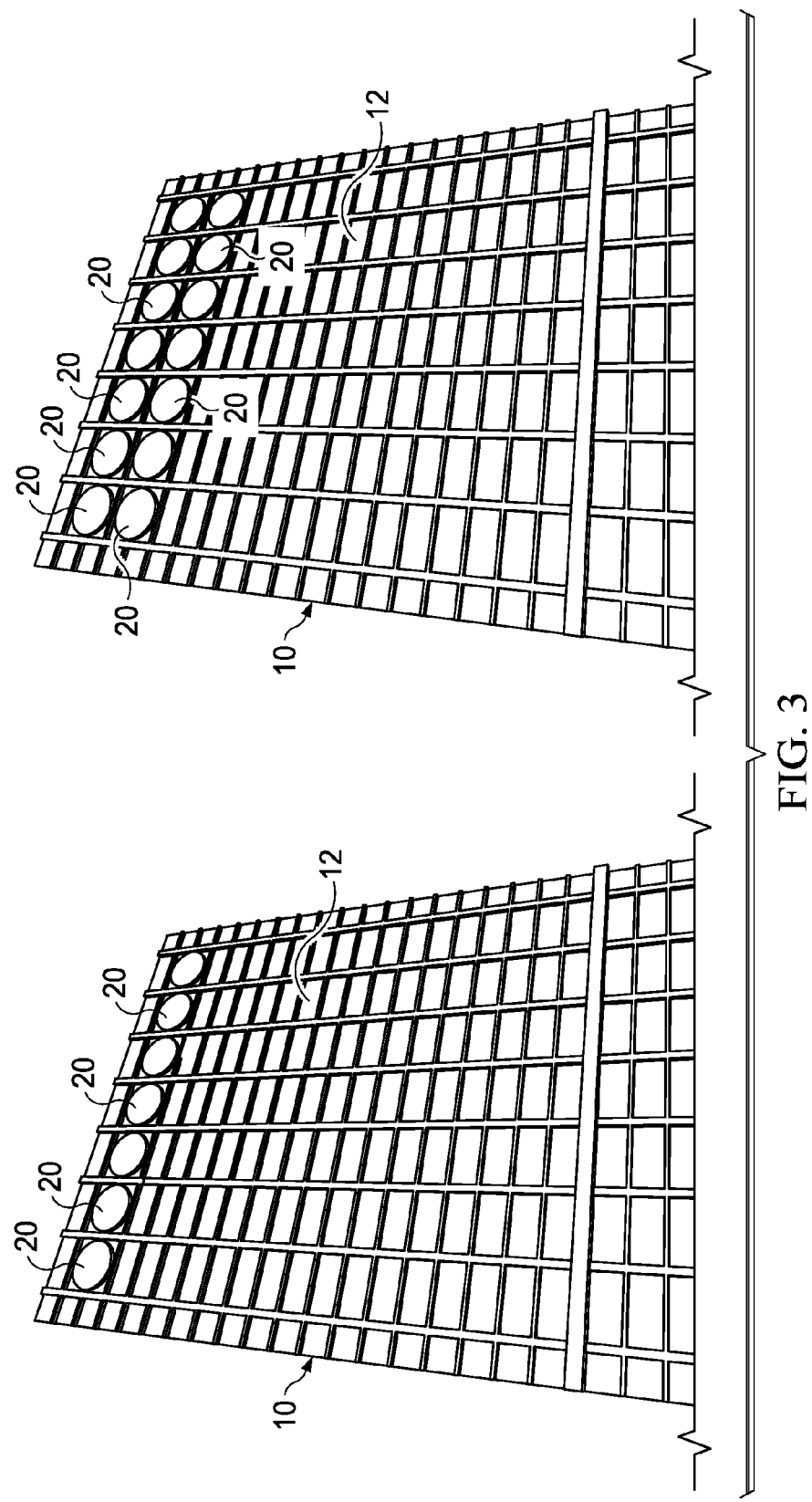
FIG. 3 is a street view of two buildings, each with a separate embodiment of the invention installed.

FIG. 3 is a street view of two buildings 10. One building has a single row of funnels 20 visible on its face 12 while the second building has two rows of funnels 20 visible on its face 12. A primary advantage of having a scalable system 16 is that additional wind capture funnels 20 and accompanying elements 18 may be added as needed. Upon assembly, the elements 18 may be attached to a rotating platform (not shown) or directly to the structural foundation. A rotating platform may allow for the funnels to move within the building to better align with winds 14 that are at an angle to the face 12 of building 10.

Figure 4:
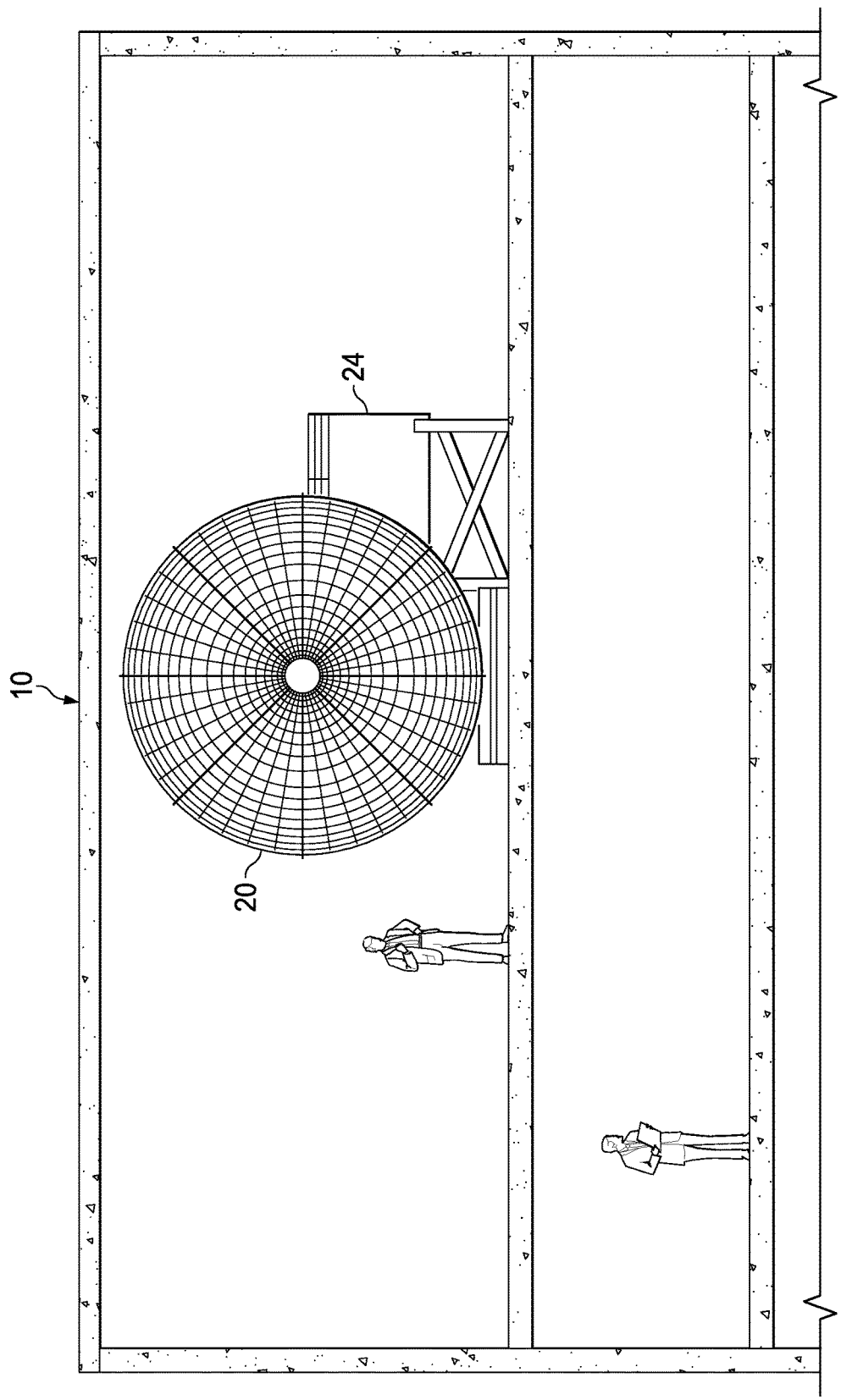
FIG. 4 is a frontal elevation view of an embodiment of the invention installed in a building.

FIG. 4 is a frontal elevation view of an embodiment of the invention installed in a building 10. From this view the funnel 20 is clearly seen with the generator 24 sticking out from behind. This view show a building 10 that has high ceilings where the funnel 20 is installed and the funnel 20 is sized accordingly. Additional funnels 20 may be added alongside the funnel 20 shown.

Figure 5:
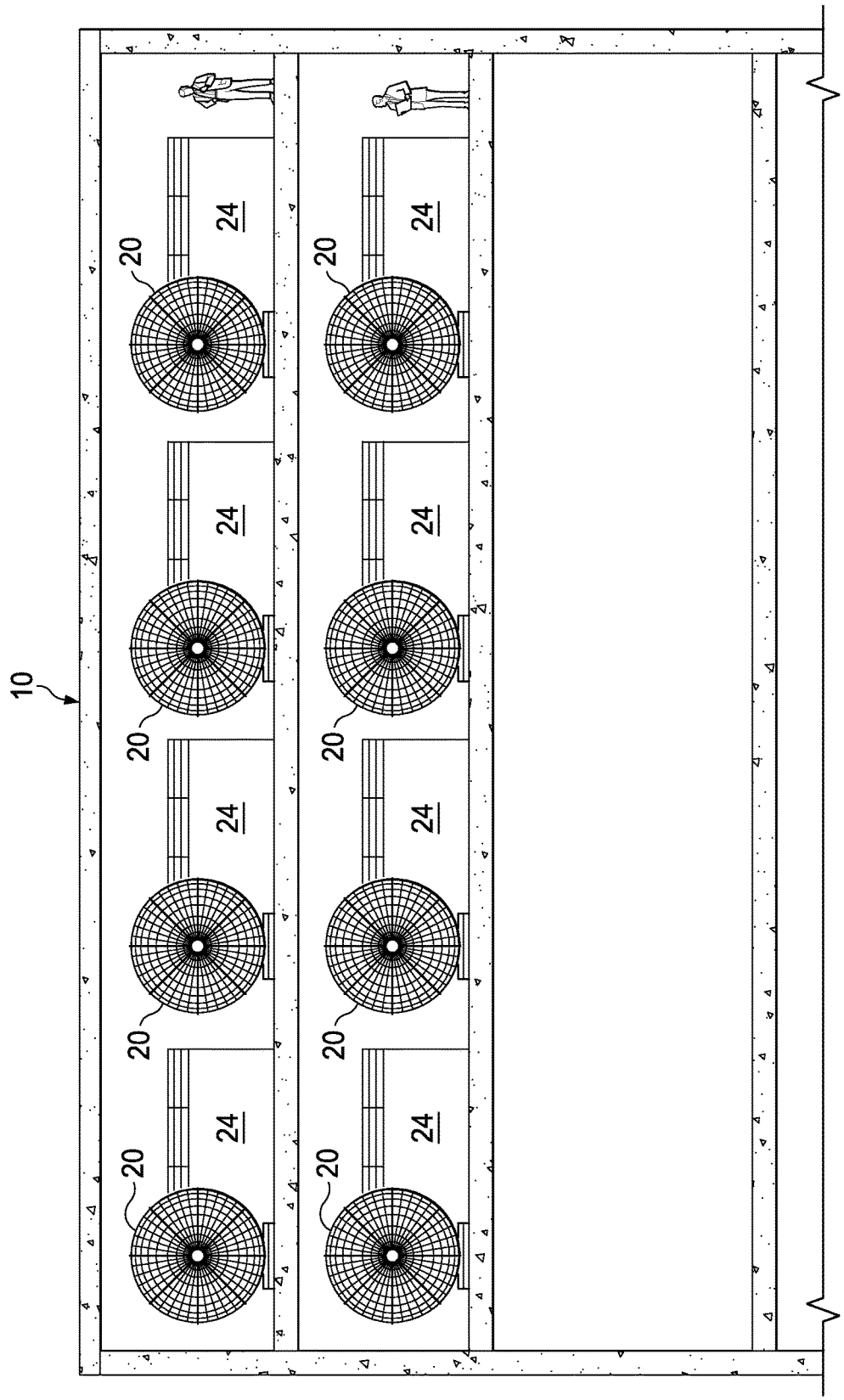
FIG. 5 is a frontal elevation view of an embodiment of the invention installed in a building.

FIG. 5 is a frontal elevation view of an embodiment of the invention installed in a building 10. This view shows an installation of two rows of funnels 20 and their accompanying elements 18 as described above. The building 10 has standard height ceilings and the funnels 10 are sized accordingly.

Figure 6:
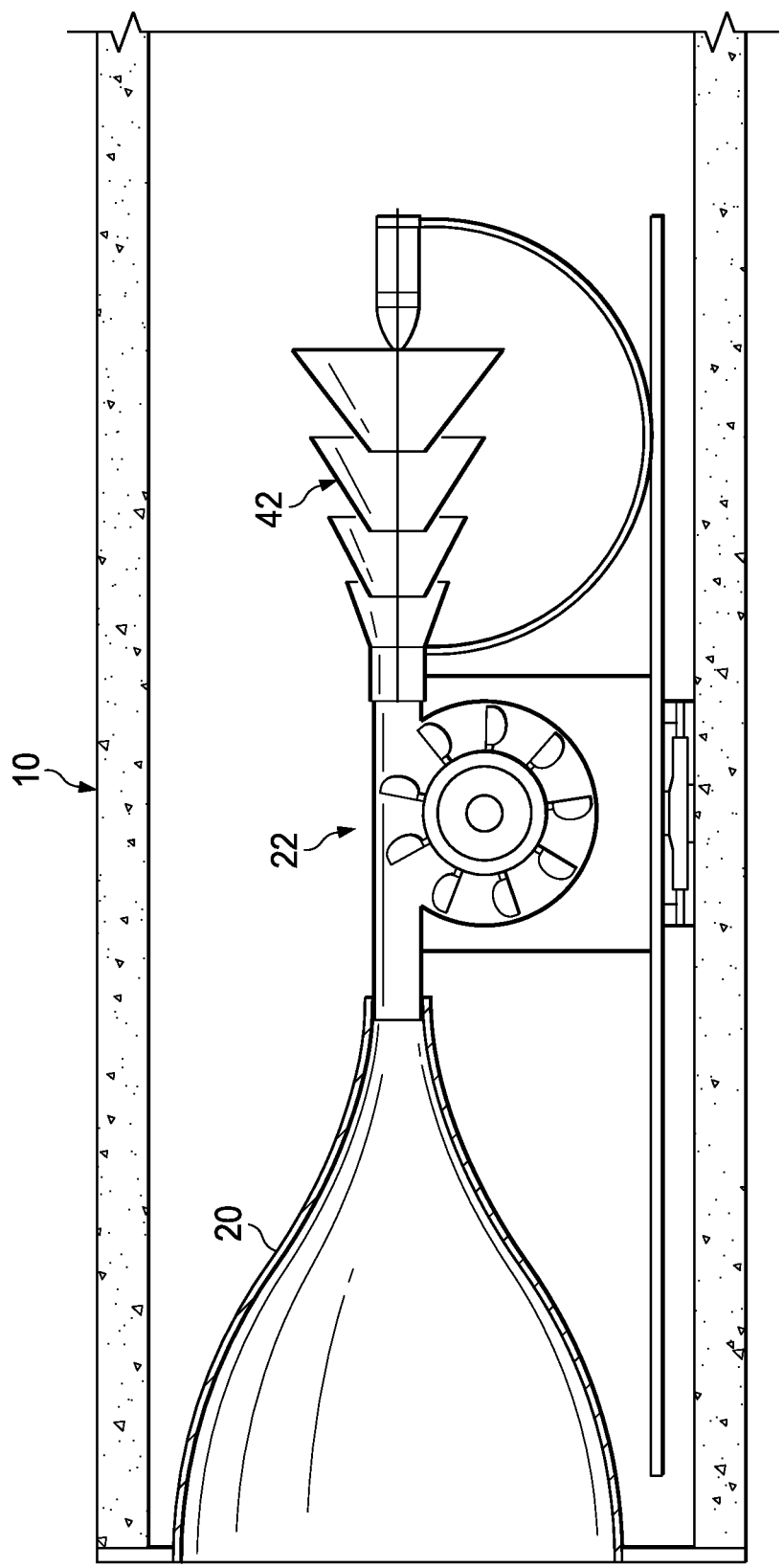
FIG. 6 is a side sectional view of a wind turbine apparatus that may be used in an embodiment of the invention.
Figure 7:
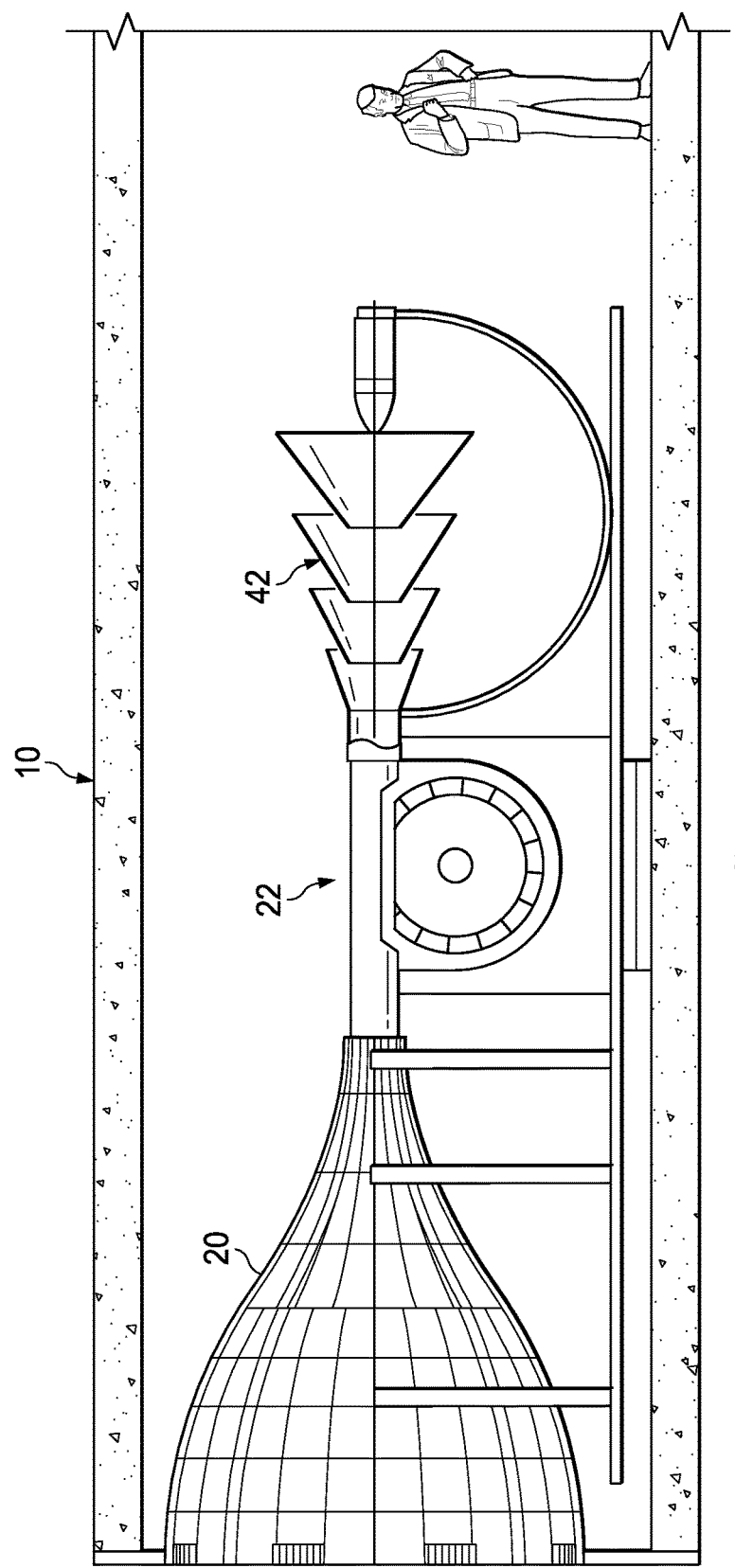
FIG. 7 is a side elevation view of a wind turbine apparatus that may be used in an embodiment of the invention.

FIG. 6 is a side sectional view of a wind turbine apparatus that may be used in an embodiment of the invention. This system 16 comprises of a funnel 20 a generator 22 and a reducer 42 all positioned within a building 10. FIG. 7 is a side elevation view of a wind turbine apparatus that may be used in an embodiment of the invention having the same basic elements as FIG. 6.

Figure 9:
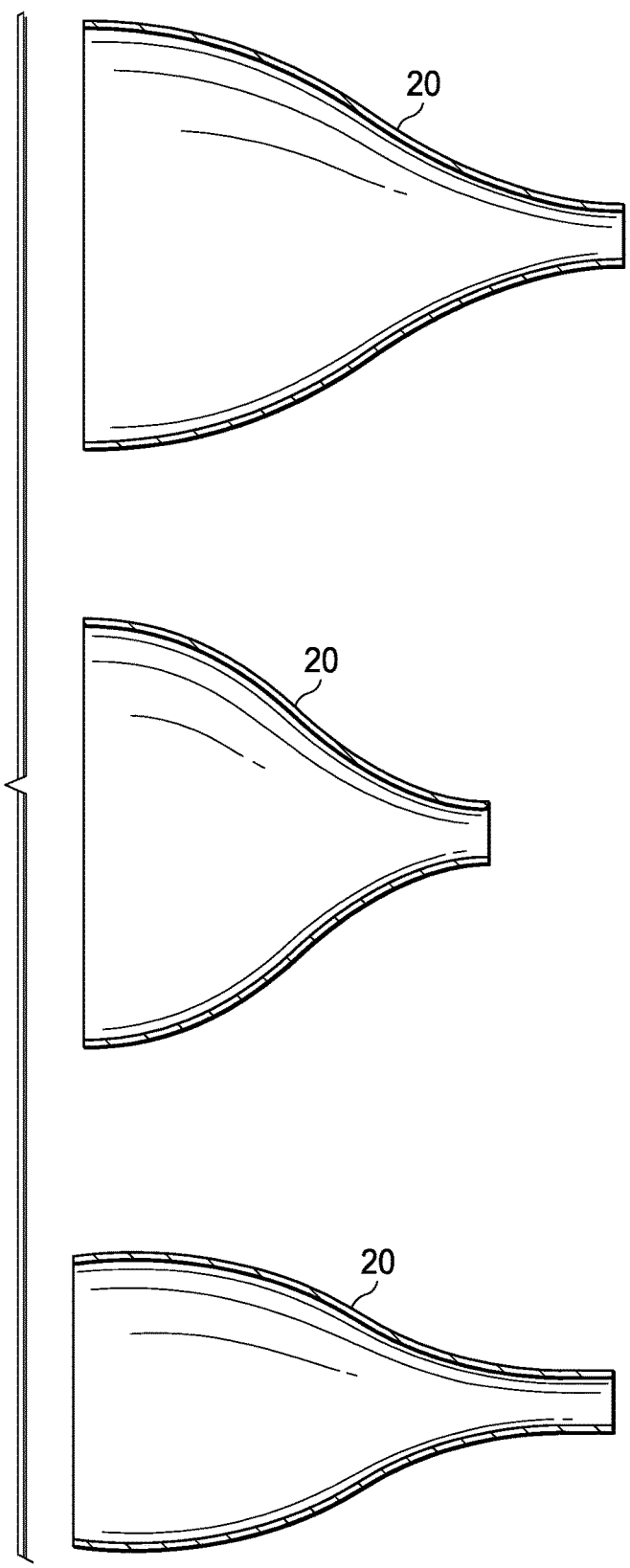
FIG. 9 is as composite view of different shapes of a capturing funnel that may be used in an embodiment of the invention.

Wind enters the system 16 through a wind-capturing funnel 20. The wind-capturing funnel 20 comprises a large funnel like shape preferably shaped following which has a wider opening on the intake side and a narrower opening on an output side. The relationship between the intake side and the output side of a fluid and the curvature of the wind capturing funnel 20 permit air to flow with the least possible resistance and at the highest speed possible. The funnel like shape may be adjusted to achieve the optimum wind capture and wind exit speed based on environmental conditions, weather, most prevalent wind speeds and size restrictions, thus the funnel may be shorter, wider, narrower, longer or in any shape, as shown in FIG. 9.

Figure 8:
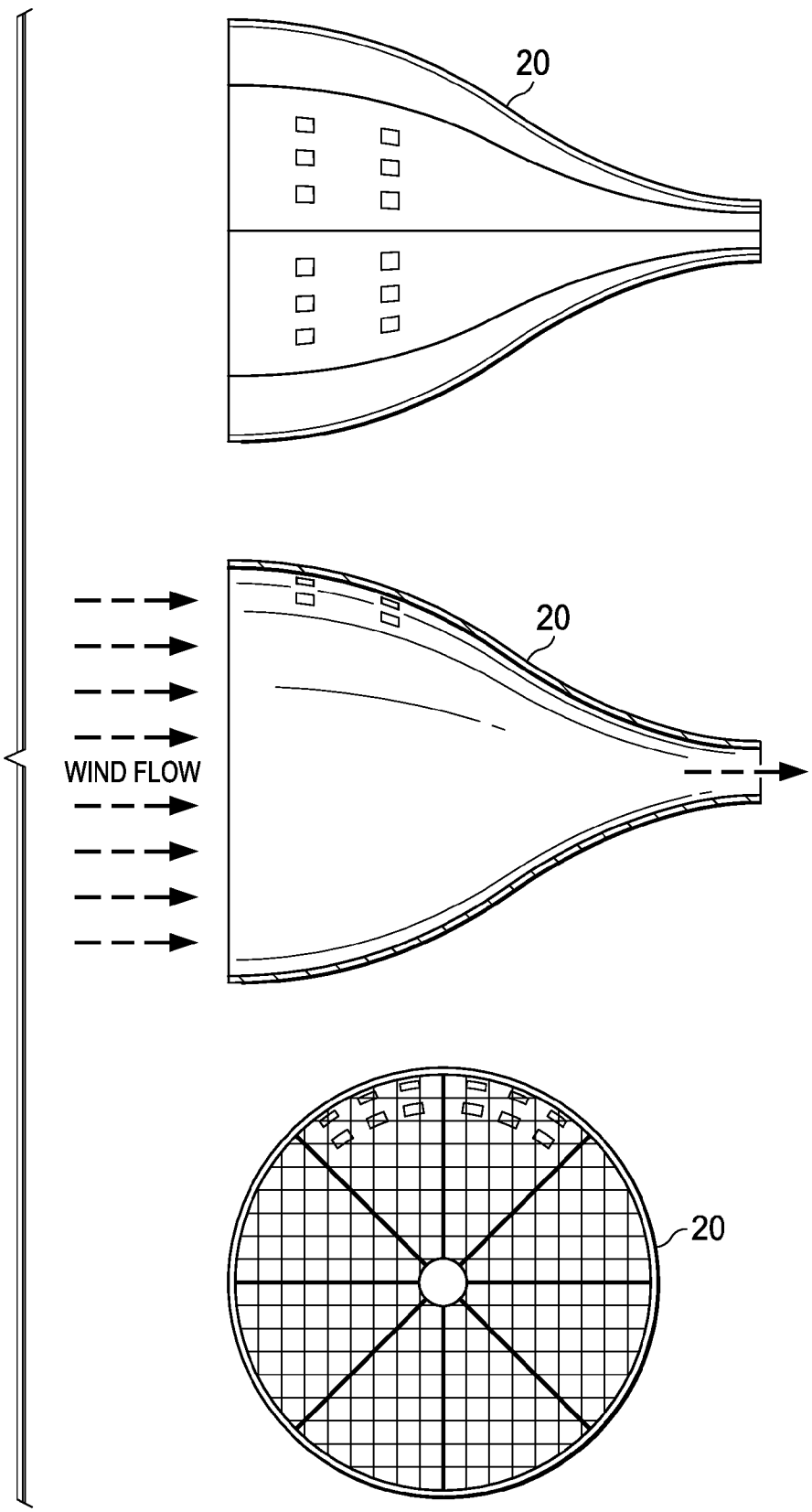
FIG. 8 is at composite of different views of a capturing funnel that may be used in an embodiment of the invention.

In some embodiments, the wind capturing funnel 20 may be a single unit or be composed of several pieces for ease of transportation and installation on existing or new high-rise buildings 10 or skyscrapers. The wind capturing funnel 20 intake side may also have thin wires arranged across so as to prevent birds from damaging the apparatus. As wind gusts can be unpredictable, the wind capturing funnel may have, on an outer surface, small windows with flaps that open and close as a function of the wind speed, thus allowing the air flow at the output side to be more stable as shown in FIG. 8. The intake side may also be partially closed with gates to reduce wind intake when speeds exceed the maximum preferred velocity as it would be in the case of hurricanes, tornados, or other inclement weather. The wind-capturing funnel may be constructed of a variety of materials from thick fiberglass to metals such as aluminum, steel or copper using known methods depending on site of installations taking into consideration environmental conditions such as salt in the air prevailing in coastal locations. After the wind leaves the funnel 20 side it enters the turbine 22.

Figure 10:
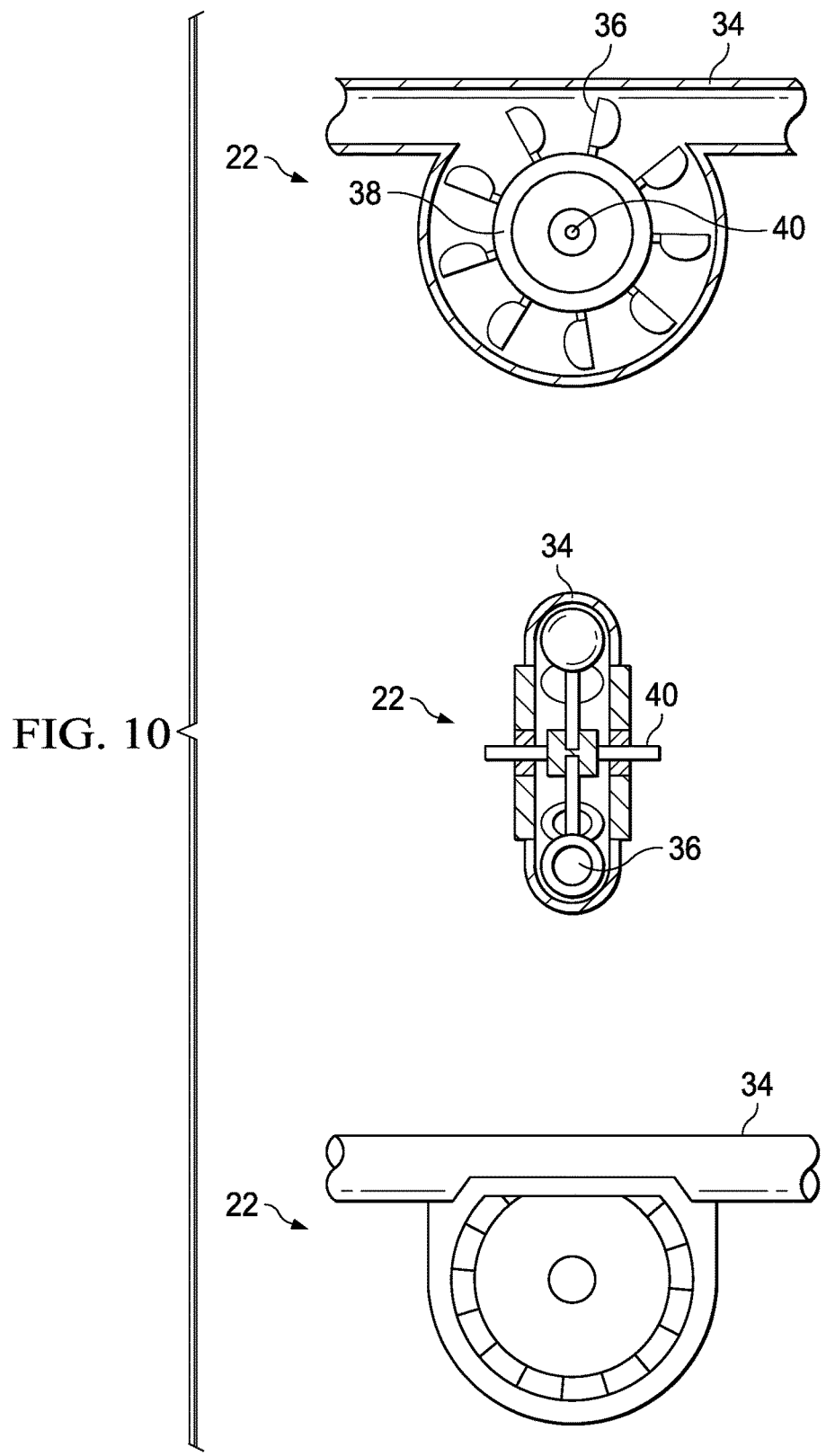
FIG. 10 is a composite view of as wind, capture device that may be used in an embodiment of the invention.

In one embodiment the turbine 22 is comprised of a windflow cavity 34, a series of cups 36 and a converter wheel 38, as more clearly shown in FIG. 10. As the wind enters through the wind-capturing funnel 20 it enters a windflow cavity 34. The windflow cavity 34 directs the wind into contact with a series of cups 36 attached to a converter wheel 38 that rotates along its horizontal axis perpendicular to the air flow. This converter wheel 38 is similar to a Pelton wheel used to produce kinetic energy from water flow. As the wind contacts a cup 36, the cup 36 moves along the direction of the spinning converter wheel 38 and fully covers the wind flow cavity 34. Once the cup 36 rotates sufficiently, the wind continues out of the windflow cavity 34. As each cup 36 moves, another cup 36 takes the place of the first cup thus causing the converter wheel 38 to spin rapidly converting the wind power into mechanical energy. The converter wheel 38 rotates enclosed in an air-tight cavity 34, which forces the wind to flow out at the point of least resistance. Each cup may also have electromagnets on the tips, such that the electromagnets are slanted towards the direction of rotation of the converter wheel and parallel to electromagnets of the same current and slant placed along the central portion of the converter wheel cavity and directly across each other. The electromagnets of the wheel cups and those on the converter wheel cavity do not touch; rather the repel each other further accelerating the rotation of the converter wheel.

The converter wheel 38 is supported by a drive rod 40. The drive rod 40 extends further than the windflow cavity 34 itself and it is used to drive direct current generators 22 connected to the drive rod 40 either directly, or through gears or pulleys. The drive rod 40 drives at least on direct current generator that may be one that improves rotation by the use of supplemental magnets and decrease friction substantially producing higher levels of electricity with the least torque. These types of direct current generators are preferred and their operation is well known in the art.

As wind 14 direction is unpredictable, a rotating platform (not shown) may be connected directly to the building 10. The rotating platform will permit the wind capturing funnel to rotate and face the maximum wind current. The rotation of the rotating platform will be driven by the power created by the generator. The merit of rotating platform may be determined by a weather vane that follows wind direction as is located on top of the building.

A reducer 42, as shown in more detail in FIG. 11, may be installed where the wind 14 exits the windflow cavity 34. The purpose of reducer 42 is to gradually reduce air speed and dampen any sound, such as whistling, that may be produced. The reducer 42 may be composed by a series of funnel like elements attached to a central support member. The spacing between the windflow cavity exit funnel-like elements may vary according to the wind at the windflow cavity exit. Each funnel-like element will deflect concentrated wind dispersing it, thus reducing the wind speed.

The electrical generators 24 are driven by the turbines 22. The electrical generators are configured to produce a direct current that are used to produce hydrogen through electrolysis in the electrolysis unit 26. An advantage of the electrolysis process is that it is very scalable by its nature and will produce usable amounts of hydrogen at lower wind speeds over time, where as charging batteries may require a higher minimum wind speed. Alternators may also be used to generate alternating current for end use.

It should be apparent from the foregoing that an invention having significant advantages has been provided. While the invention is shown in only a few of its forms, it is not just limited but is susceptible to various changes and modifications without departing from the spirit thereof.

What is claimed is:

1. A power generating system for a building comprising:
    a wind turbine comprising:
        a wind capturing funnel, wherein the wind capturing funnel has a symmetrical hourglass shape;
        a straight horizontal tube cavity that is collinear with and coupled to the wind capturing funnel;
        a turbine aligned and coupled to the straight horizontal tube, wherein the wind capturing turbine comprises a plurality of cups coupled to a conversion wheel coupled to a rod at its axis;
        the straight horizontal tube cavity is configured to allow wind to flow freely and strike the plurality of cups to spin the conversion wheel;
        a wind speed reducer that is collinear with and coupled to the straight horizontal tube cavity and opening into the interior of the building; and
    a generator coupled to the rod.

2. The power generating system of claim 1 wherein the funnel comprises a single unit or several pieces and is configured for easy transport.

3. The power generating system of claim 1 wherein the interior of the hourglass shaped funnel comprises a smooth curved surface configured to allow wind to flow with less resistance along the interior surface of the funnel.

4. The power generating system of claim 3 wherein the funnel is configured to prevent foreign objects of debris from entering the funnel.

5. The power generating system of claim 1 wherein the hourglass shaped funnel comprises pressure reducing openings with flaps configured to reduce high wind speeds which enter the funnel.

6. The power generating system of claim 1 wherein the wind capturing funnel is positioned along a face of the building which faces prevailing winds.

7. The power generating system of claim 1 wherein the horizontal tube comprises first magnets along the interior top surface of the horizontal tube adjacent to the cups arranged in a perpendicular position with reference to the location of the magnets.

8. The power generating system of claim 7 wherein the cups include second magnets positioned along the top edge of the cups having equal polarity as the first magnets of the horizontal tube, wherein the first and second magnets repel one another and the cups rotate the conversion wheel even in the absence of strong wind flow.

9. The power generating system of claim 1 wherein the conversion wheel rotates along a horizontal axis perpendicular to the horizontal tube cavity.

10. The power generating system of claim 1 wherein the conversion wheel is coupled with the plurality of cups along the edge of the conversion wheel.

11. The power generating system of claim 1 wherein cups of the conversion wheel move into the horizontal tube cavity and is rotated by the wind flow and moves the cup into a position perpendicular to the direction of the prevailing wind.

12. The power generating system of claim 1, wherein the cups rotate into the horizontal tube covering substantially the entire interior diameter of the horizontal tube.

13. The power generating system of claim 1 wherein the system optionally includes a plurality of wind turbines which are located in multiple locations of the building, wherein the wind turbine or plurality of wind turbines are positioned on the side of the building facing the prevailing wind.

14. The power generating system of claim 1 wherein the power generating system is configured to not interfere architecturally with a core of the building.

15. The power generating system of claim 14 wherein the power generating system is configured to reduce architectural impact, structural impact, or building design in a new or an existing building.

16. The power generating system of claim 14 wherein the core of the building comprises elevator banks, shafts, emergency exits, stair wells, or restrooms.

17. The power generating system of claim 1 wherein wind flows through the wind speed reducer collinearly and is released outside of the building.

18. The power generating system of claim 17 wherein the wind speed reducer comprises a plurality of inverted funnels arranged to expand in the direction opposite to the prevailing wind direction to reduce wind speed.

19. The power generating system of claim 18 wherein a horizontal travelling wind that misses a first inverted funnel positioned closest to the horizontal tube cavity strikes a following inverted funnel and is further redirected at an angle away from the direction of wind flow to further slow down the wind flow speed.

20. The power generating system of claim 1 wherein the rod of the turbine that is coupled to the generator spins the generator to produce electrical energy.

21. The power generating system of claim 20 wherein a first set of magnets may be positioned in the generator casing in a parallel and opposite position to a second set of magnets of equal polarity positioned in the generator core configured to repel and rotate the generator.

22. The power generating system of claim 1 wherein the generator coupled to the rod of the turbine converts kinetic energy to electricity.

* * * * *